Aug. 7, 1945.  A. S. EDMONDS  2,381,654
BRAKE
Filed July 25, 1942  2 Sheets-Sheet 1

INVENTOR
ASBURY S. EDMONDS
BY
ATTORNEY

Aug. 7, 1945. A. S. EDMONDS 2,381,654
BRAKE
Filed July 25, 1942 2 Sheets-Sheet 2
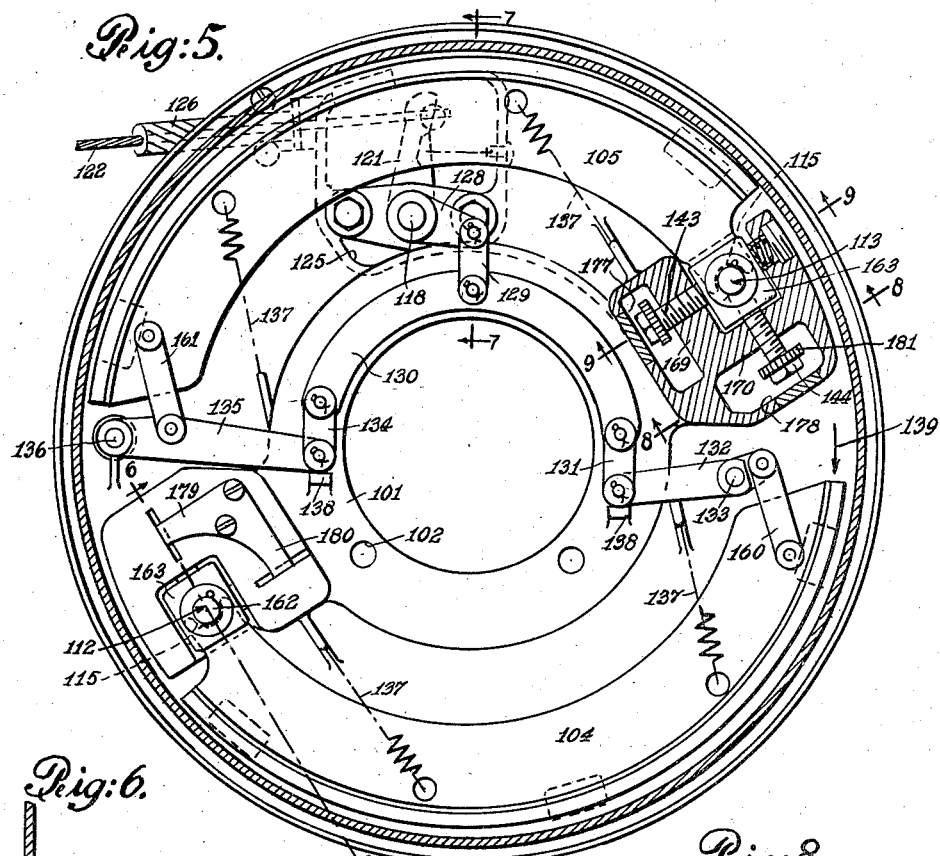
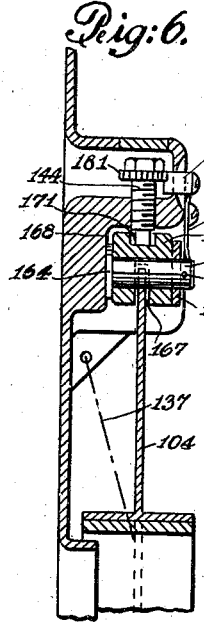
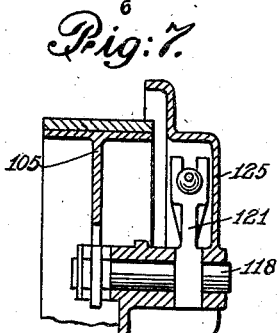
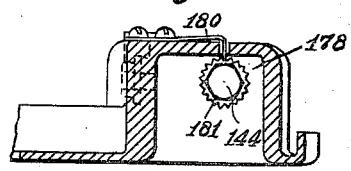
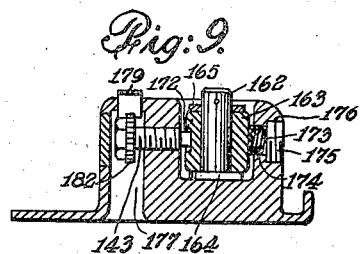
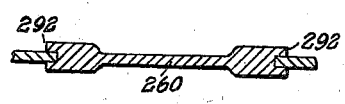
INVENTOR.
ASBURY S. EDMONDS
BY
ATTORNEY.

Patented Aug. 7, 1945

2,381,654

UNITED STATES PATENT OFFICE 2,381,654

BRAKE

Asbury S. Edmonds, New York, N. Y.

Application July 25, 1942, Serial No. 452,277

8 Claims. (Cl. 188—79.5)

The present invention relates to brakes for rotating wheels and in particular to brakes for the wheels of automotive vehicles. Hydraulically operated brakes, although widely used on vehicles such as automobiles and trucks have serious inherent disadvantages. The master cylinder of a hydraulic brake system must be connected with the operating cylinders of each brake by means of fluid type conduits which are subjected to high fluid pressure when the brakes are applied. If any of the conduits is broken or punctured or develops a leak, the brake fluid is permitted to escape, rendering the brakes on all wheels inoperative. This disadvantage is particularly serious when vehicles are used in warfare where they must go over rough terrain and obstacles that may damage the brake fluid conduits, and where the fluid conduits are liable to damage by bullets or by shell or bomb fragments.

An object of the present invention is to provide a mechanically operated brake avoiding the disadvantages of hydraulic operation. A further object of the invention is to provide brakes having maximum braking action with minimum application of force to and travel of the brake operating pedals. An objection to which mechanical brakes have heretofore been subject is that the mechanical advantage of the linkage system connecting the brake pedal with the brake shoe, i. e., the ratio of travel of the pedal to the travel of the shoe must be high in order to obtain adequate braking action and the high mechanical advantage or leverage requires the brake pedal to be moved through a correspondingly great distance to apply the brakes. As the linings of the brake shoes become worn, the brake pedal may be incapable of bringing the brake shoes into effective engagement with the brake drum, making necessary the frequent adjustment of the brake to compensate for wear. These objections are overcome by the brake of the present invention wherein effective braking action is obtained with relatively low leverage, requiring lesser movement of the brake pedal and leaving a greater portion of the permissible range of movement of said pedal available for taking up slack arising from wear of the brake shoe lining. Moreover, as the shoe is moved a greater distance for each increment of movement of the brake pedal, it is brought more quickly into engagement with the brake drum as a lesser movement of the pedal is required for this purpose. By reason of these advantageous characteristics, the brakes require no adjustment to compensate for wear, except at infrequent intervals.

The effectiveness of the brakes of the present invention is derived from a number of cooperating factors. One factor contributing to the high efficiency of the brake is that each of the shoes of the brake is a primary shoe. By the term "primary shoe" is meant that the shoe is so arranged that the revolution of the drum in a direction corresponding to the forward motion of the vehicle tends upon making of contact between the shoe and drum, to press the shoe more tightly against the drum, thereby increasing the braking action obtained. A usual arrangement is for both of the customary two shoes of a brake to be actuated by a cam at their adjacent ends, with the result that one of the shoes is a primary shoe, the braking action of which is increased by the forward revolution of the wheel, while the other is a secondary shoe, the braking action of which is decreased by the forward revolution of the wheel. The braking action of the second shoe is hence less than that of the first, and the wear on the primary shoe is correspondingly greater. In the brake of the present invention, both shoes are primary shoes so that the combined braking action is greater and the braking action and the wear of the two shoes are equal.

A cooperating factor contributing to the effectiveness of the brake of the present invention is that the linkage system of the brake by which the force for operating the brake is applied to press the brake shoes against the brake drum is extremely simple in construction and is so arranged that the force is transmitted in a direct line from one element to another in a direction substantially coincident with the direction of movement of the respective elements so that a maximum proportion of the force applied to the brake pedal is utilized to produce effective braking pressure.

A further cooperating feature contributing to the high efficiency of the brakes in accordance with the present invention is a novel arrangement for adjusting the brake shoes so that each shoe may be speedily and accurately positioned with respect to the brake drum to obtain even wear, uniform contact and maximum braking action.

Other objects and advantages of the invention will be understood from the following description of the embodiment selected by way of example, and illustrated in the accompanying drawings in which Fig. 1 is an elevation of the brake mechanism as seen from the inner or wheel side of the brake with the brake drum shown in cross section.

Fig. 5 is an elevational view similar to Fig. 1 but showing another form of brake in accordance with my invention.

Fig. 6 is a sectional view through the adjusting mechanism taken on the line 6—6 in Fig. 5.

Fig. 7 is a fragmentary view partially in section taken approximately on the line 7—7 in Fig. 5.

Fig. 8 is a sectional view taken on the line 8—8 in Fig. 5.

Fig. 9 is a sectional view taken on the line 9—9 in Fig. 5.

Fig. 10 is a fragmentary elevational view showing a modification.

Fig. 11 is a sectional view taken on the line 11—11 in Fig. 10.

Figure 1:
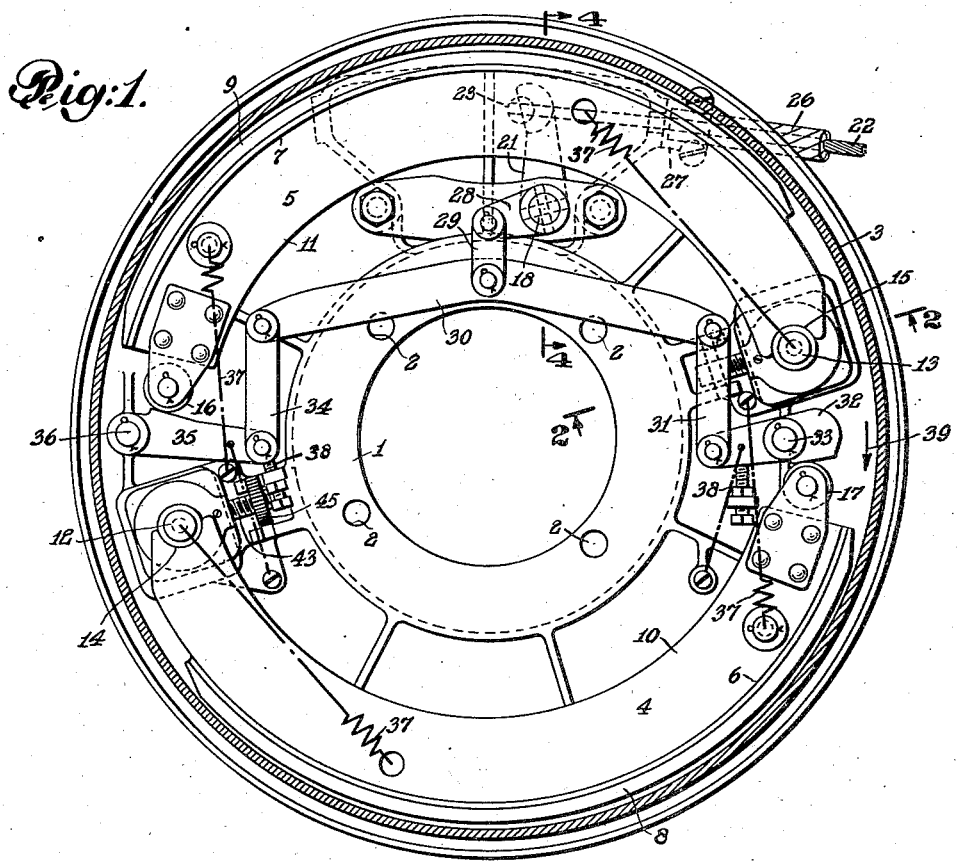
Fig. 1A is a fragmentary elevation corresponding to the upper portion of Fig. 1, but showing a modification.

The embodiment of the invention shown by way of example in Figs. 1 to 4 has a back plate 1, having holes 2 for securing it to a fixed portion of the vehicle adjacent the wheel, as for example, the front axle or the rear axle housing. A brake drum 3 is secured to and rotates with the vehicle wheel. On the inner side of the back plate and in the space enclosed by the back plate, the brake drum and the wheel, there are provided two brake shoes 4 and 5 having flange portions 6 and 7 with lining 8 and 9 and web portions 10 and 11. The brake shoes are loosely supported on the back plate and adapted to pivot about pivot members 12 and 13 disposed at diametrically opposite sides of the back plate. It will be seen that each of the brake shoes has at the end adjacent the pivot a concave arcuate bearing surface 14, 15 adapted to engage a convex arcuate bearing surface on the pivot member 12, 13. At the other or free end of each brake shoe, the web portion 10, 11, is provided with a bifurcated extension carrying a roller 16, 17 adapted to be engaged by the operative mechanism for moving the brake shoes about their pivots into engagement with the brake drum 3.

Figure 1A:
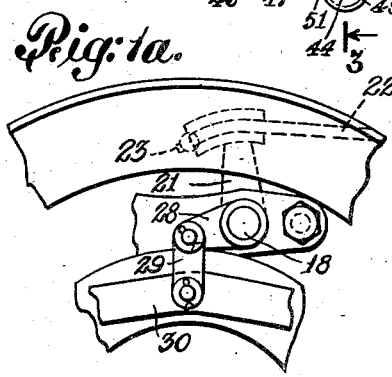
Figure 4:
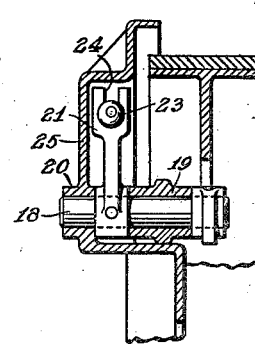
Fig. 4 is a fragmentary view partially in section and partially in elevation taken approximately on the line 4—4 in Fig. 1.

As shown in Figs. 1 and 4, the operating mechanism comprises a rocker shaft 18, as rotatably supported by bearings 19 and 20, with its axis parallel to the axis of rotation of the vehicle wheel. On the rocker shaft 18 there is mounted a rocker arm 21 with which is connected a tension member shown in the form of a cable 22 having at its end a ball 23 received in a bifurcated socket 24 at the outer end of the rocker arm. The cable 22 is connected to a brake pedal or lever (not shown) through suitable equalizing means such as that shown in U. S. Patent No. 2,227,301 for equalizing the braking action on all of the braked wheels of the vehicle, and thus transmits force from the pedal to the brake mechanism. It will be seen that the rocker arm 21 and adjacent portions of shaft 18 are located in a blister 25 protruding on the outer side of the backing plate 1, and that the cable 22 extends out through the wall of the blister in a straight line which is approximately perpendicular to the plane defined by the axis of shaft 18 and the radius of arm 21. As the force applied to the outer ends of the rocker arm is in a plane substantially perpendicular to the axis of the vehicle wheel and in a direction substantially perpendicular to the radius of the rocker arm, it will be seen that the pull of the cable is thus substantially in line with the direction of movement of the outer end of said arm, so that the full force of the cable tension is applied to rock the shaft 18. Although the angle of the arm changes as the shaft is rocked, the variations within the limits of movement of the operating mechanism is so slight as to be inconsequential. Preferably the pull of the cable is exactly perpendicular to the radius of the rocker arm at a mid point in its movement. If desired, the rocker arm may be in the form of a segment of a pulley as shown in Fig. 1A so that the pull of the cable will be exactly perpendicular to the effective radius of the rocker arm at all times. The cable 22 is preferably sheathed in a conduit 26 secured to the wall of the blister 25 by a suitable fitting 27.

At the inner end of shaft 18 there is provided another rocker arm 28 connected by a link 29 to an equalizer bar 30. The arm 28 and link 29 are arranged at approximately right angles to one another. One end of the equalizer bar 30 is connected by a link 31 with the inner ends of an actuating lever 32 pivotally supported by a post 33 carried by the back plate. The other end of the equalizing bar is similarly connected by a link 34 to an actuating lever 35 pivotally supported on a post 36. It will be seen that one of the actuating levers 32 is a primary lever, i. e., the pivot point is located between the point of application of force and the load, while the other actuating lever 35 is a secondary lever i. e., the load is located between the pivot point and the point of application of force. Although one of the actuating levers is a primary lever and the other a secondary, the levers have the same mechanical advantage and the arrangements of the equalizing bar 30 and of the actuating levers assures that equal force is applied to both shoes.

The brake shoes are provided with suitable springs 37 for holding the shoes out of contact with the brake drum, except when the brakes are applied by operation of the actuating mechanism. Suitable stops 38 which may be adjustable as shown are provided for limiting the extent of movement of the brake shoes and actuating mechanism by the springs 37. To avoid torsional stresses the connecting links 29, 31 and 34 may be double or may have bifurcated ends so as to embrace the both sides of the connecting members.

As will be seen from Fig. 1, the direction of pull of the link 31 is substantially in the direction of movement of the inner end of actuating lever 32 to which the link is connected, and the lever acts on the free end of brake shoe 4 in a direction substantially in line with the direction of movement of said free end. The same is true of link 34 and actuating lever 35, the links 31 and 34 being substantially parallel to one another. Thus, the force is in each instance transmitted substantially in line with the direction of movement of the part to which the force is applied, assuring that the full force is utilized in applying the brake and wasted effort is avoided.

The direction of rotation of the vehicle wheel and attached brake drum 3 corresponding to forward motion of the vehicle is clockwise as viewed in Fig. 1, as indicated by the arrow 39. It will be seen that with reference to this direction of rotation, each of the brake shoes is pivoted at its heel or trailing end and is actuated by the operating mechanism at its toe or leading end. With this arrangement, the frictional engagement of the drum with the shoe tends to swing the shoe about its pivot in a clockwise direction, and hence into firmer contact with the drum. Both of the brake shoes 4 and 5 are hence primary shoes and their braking action is increased by the self-energizing characteristic of primary brake shoes. Moreover, it will be appreciated that the braking action of the two shoes is equal and that the brake lining will be subjected to equal wear.

By reason of both brake shoes being primary shoes, as well as by reason of the simplicity of the linkage of the operating mechanism and the direct manner in which force for operating the shoes is transmitted, adequate braking action is obtained by the brake of the present invention without employing the high mechanical advantage heretofore considered necessary in mechanically operated brakes. In the embodiment shown in Figs. 1 to 4 the mechanical advantage of the linkage, i. e., the ratio of the travel of cable 22 to the movement of that point on each of the actuating levers at which the lever engages the roller 16, 17 of the respective brake shoes is approximately 7 to 1 but a lever ratio is adequate. The effectiveness of the brake of the present invention is further augmented by the novel arrangements for accurately positioning each brake shoe with respect to the brake drum. As the brake shoes are carried by the back plate 1 which is attached to a fixed part of the vehicle while the brake drum is attached to the wheel and rotates therewith, it is not possible as a practical matter to center the brake shoes accurately with respect to the drum in the manufacture of the brake. Hence, adjustment is necessary to center the shoes after the brake is installed. Adjustment is also necessary to compensate for the progressive wearing of the brake lining.

Figure 2:
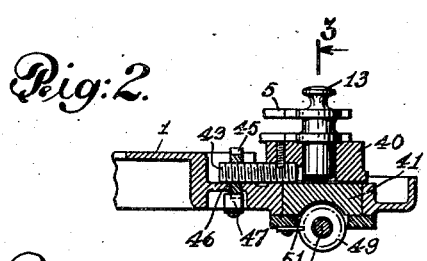
Fig. 2 is a fragmentary sectional view of the adjusting mechanism taken on the line 2—2 in Fig. 1.
Figure 3:
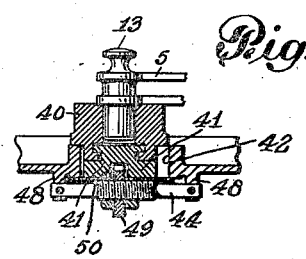
Fig. 3 is a fragmentary sectional view taken on the line 3—3 in Fig. 2.

In accordance with my invention the pivot members 12 and 13 about which the brake shoes pivot are movable in any direction parallel to the plane of the backing plate, and independently operable means are provided for moving the pivot member in one direction to center the shoe with respect to the brake drum and in another direction approximately at right angles to the first to move the brake shoe toward the drum to compensate for wear. It will be understood that the plane of the backing plate is perpendicular to the axis of the vehicle wheel. As the arrangement for adjusting both pivot members 12 and 13 is the same, the same reference numerals will be used for corresponding parts. In the embodiment shown in Figs. 1, 2 and 3, the pivot member 13 is carried by a base 40, slidably mounted, for example, by a tongue and groove arrangement (Fig. 3) on a slide 41 for movement in a direction approximately radially of the back plate. The slide 41 is in turn slidably mounted in an aperture 42 in the back plate for movement in a direction substantially perpendicular to the direction of movement of the base 40. The slide 41 is shown as being made in two pieces to facilitate assembly with the back plate. By movement of the base 40 relative to the silde 41, the brake shoe 5 can be centered so that when the brake is applied all portions of the brake lining will bear uniformly on the drum 3. By movement of the slide 41 relative to the back plate, the brake shoe may be moved toward the brake drum to compensate for wear of the lining. As shown in Figs. 1, 2 and 3, the means for moving the pivot member comprises coordinate screws 43 and 44 located approximately at right angles to one another. The screw 43 (Fig. 2) is fixed to the base 40 and engages a nut 45 rotatably received in a slot 46 in the back plate. As the nut 45 is held against movement in a direction axially of screw 43 by engagement with the side of the slot 46, rotation of the nut will result in axial movement of the screw and base 40 relative to the back plate. The nut 45 projects through the slot 46 to the outside of the back plate so that it may be turned without dismantling the brakes and the periphery of the nut is serrated to facilitate turning the nut. A pawl 47 which is preferably resiliently pressed against the nut is provided to engage the serrations and hold the nut in the position to which it has been indexed. The screw 44 (Fig. 3) is secured to the back plate by bracket portions 48 and engages a nut 49 rotatably received in a slot 50 in slide 41. As the screw shaft 44 is held against rotation or axial movement by the brackets 48 the rotation of the nuts will move the slide and hence the pivot member in a direction axially of screw 44. The nut 49 like nut 45 is accessible from the outside of the backing plate and may similarly be serrated and provided with a pawl 51.

It will be understood that the centering adjustment of the brake shoe is effected by means of screw 43, while the wear adjustment is effected by means of screw 44. Either adjustment can be made independently without disturbing the other. As a matter of practice it has been found necessary to use the centering adjustment only at the time the brake is assembled with the wheel whereafter it is necessary only to take up the wear adjustment occasionally to compensate for the wear of the brake linings. The adjustment of the brake shoes in accordance with the invention thus insures effective engagement of the brake drum with the shoes throughout their entire braking area and contributes to the effectiveness of the brake as a whole.

A further embodiment of my invention is shown in Figs. 5 to 9 in which corresponding parts are indicated by the same reference numerals as in Figs. 1 to 4, with the addition of 100. As the general arrangement is the same, this embodiment will be described only briefly with emphasis on points of difference. The two brake shoes 104 and 105 are both primary shoes and are loosely supported on the back plate 101 for pivotal movement about movable pivot members 112 and 113. The operating mechanism comprises a rocker arm 121 on a shaft 118 carrying a second rocker arm 128 connected through a link 129, an equalizer bar 130 and links 131 and 134 with actuating levers 132 and 135 pivoted respectively at 133 and 136 on the back plate. The rocker arm 121 is located in a blister 125 protruding outwardly from the back plate and a cable 122 extends out through the wall of the blister in a straight line lying in a plane substantially perpendicular to the axis of the wheel. The direction of pull of the cable is also substantially perpendicular to the radius of the rocker arm 121 and to a plane defined by the axis of shaft 118 and the radius of arm 121 so that the pull of the cable applies maximum torque to shaft 118. The equalizing bar 130 is of arcuate form so that the bar occupies a minimum of space.

The actuating lever 132, a primary lever, is connected with the toe of brake shoe 104 by a link 160 that extends substantially in line with the direction of application of force to the shoe, so that force is transmitted in a direct line with maximum effectiveness. The pivotal connection of the link 160 with the shoe and with the actuating lever prevents any shifting of the point of application of force and assures the same leverage throughout the range of movement of the parts. A link 161 similarly connects actuating lever 135, a secondary lever, with the other brake shoe 105. The links 160 and 161 as well as the links 129, 131 and 134 may be double or bifurcated to avoid torsional stresses in the linkage system. Springs 137 are provided for holding the brake shoes out of engagement with the brake drum when the brakes are not applied and stops 138 limit the movement of the brake shoes and connecting mechanism by the springs.

The pivot members for the brake shoes are floating members supported by, but unattached to the back plate and free to move in any direction in a plane perpendicular to the axis of the wheel, i. e., in a plane parallel to the plane of the back plate. As the arrangement of the two pivot members is identical, the same reference numerals will be used for corresponding parts of each. In the form shown each pivot member comprises a pin 162 extending through a hole in a block 163. The pin 162 has a head 164 and is assembled with the block by a washer 165 and cotter pin 166. The block 163 is cut away as indicated as 167 to permit the arcuate bearing surface 115 of the brake shoe to bear against pin 162. In the form shown, the web portion of the brake shoe bears against only one side of the pin 162, but it may if desired extend around the pin. The head 164 of the pin 162 rests on a flat bearing surface 168 provided on the inner side of the back plate and has sliding contact therewith. The floating pivot member is thus free to move in a direction to center the brake shoe with respect to the drum and/or in a direction to move the shoe toward or away from the drum.

As shown in Figs. 5, 6 and 8 the means for moving the floating pivot member to adjust the position of the brake shoe comprises coordinate screws 143 and 144, which are disposed at approximately right angles to one another and are located in the same plane, namely a plane parallel to the plane of the back plate and hence perpendicular to the axis of the wheel. The screw 143 is threaded through an inwardly projecting support 169 provided on the backing plate, and the inner end of said screw engages one side of the block 163. The other screw 144 is likewise threaded through an inwardly projecting support 170 and engages another side of the block 163 at approximately right angles to the side engaged by screw 143. The block 163 is shown as being recessed at 171 and 172 to receive the ends of the screws, the recesses being larger than the ends of the screws to permit movement of the block. By propelling or retracting screw 143 the block 163 and hence the pivot of the brake shoe is moved substantially radially of the back plate to center the shoe with respect to the drum. By propelling or retracting the screw 144, the pivot of the brake shoe is moved at approximately right angles to its direction of movement by screw 143 to adjust the distance between the shoe and the drum and thereby compensate for wear without in any way disturbing the centering adjustment. The block 163 is held against the end of screw 144 by the springs 137 acting on the brake shoe. The block is held against screw 143 by a resilient element shown in the form of a spring plunger 173. The spring 173 is carried by an inwardly projecting support 174 on the back plate and the pressure of the spring can be adjusted by means of a threaded plug 175 closing the outer ends of the hole 176 through which the spring plunger is inserted in assembling the brake. By reason of springs 137 and 173 the coordinate screws 143 and 144 are capable of moving the pivot member in any direction parallel to the plane of the back plate.

To facilitate adjustment of the brake without removing the wheel, provision is made for turning the coordinate screws 143 and 144 from outside the back plate 101. In the embodiment shown this is accomplished by providing the back plate with recesses or pockets 177 and 178 into which the pins of the screws project so that the heads are accessible from outside the back plate and may be turned by a suitable wrench. The coordinate screws are provided with means for holding them in the position to which they have been indexed. This may be in the form of resilient pawls 179 and 180 engaging indexing members on the screws which may be the heads of the screws or serrated discs 181 and 182 as shown. As illustrated in Figs. 5, 6 and 8 the pawls are formed by a flat L-shaped spring member mounted on the inner side of the back plate and having end portions bent at right angles and extending out through slots in the back plate into engagement with the index members. By means of the arrangement shown, an extremely simple, convenient and accurate adjustment of the brake shoes is provided.

A modification of the brake of Figs. 5 to 9 is shown in Figs. 10 and 11. The link 260 instead of being connected to actuating lever 132 and to brake shoe 104 by pivot pins as in the case of Fig. 5, is provided with arcuate bearing ends fitting into arcuate recesses or pockets 290 and 291 in the actuating lever and the web of the brake shoe respectively. Provision is made for example, by providing the link with flanges 292 to prevent lateral displacement of the link relative to the actuating lever and the web of the brake shoe. As the link 260 is at all times under compression by reason of the spring 137 acting on the brake shoe, it will be held firmly in place. In assembling the brake, the link 260 may be easily and quickly snapped into position. It will be understood that the link connecting the other shoe with its actuating lever may be similarly formed.

What I claim and desire to secure by Letters Patent is:

1. In a brake for a vehicle wheel having a brake drum, the combination of a back plate, two primary brake shoes movably supported on said plate, a movable pivot member pivotally supporting one end of each brake shoe and coordinate screws disposed on intersecting lines for moving said pivot members relative to said back plate, one of said screws being arranged to move the pivot member in a direction to center the brake shoe relative to the drum and another of said screws being arranged to move the brake shoe towards the drum to compensate for wear.

2. In a brake for a vehicle wheel having a brake drum, the combination of a back plate, a floating pivot member slidably supported on the back plate for movement in any direction parallel to the plane of said plate, a brake shoe pivoted on said pivot member and coordinate screws for moving said pivot member relative to the back plate.

3. In a brake for a vehicle wheel having a brake drum, the combination of a back plate, a floating pivot member supported for movement in any direction in a plane perpendicular to the axis of the wheel, a brake shoe pivoted at one end on said pivot member, coordinate screws for moving said pivot members radially outwardly of the back plate and also in a direction to move the brake shoe towards the drum to compensate for wear, and resilient elements for moving the pivot member in opposite directions.

4. In a brake for a vehicle wheel having a brake drum, the combination of a back plate, a pivot member supported on the inner side of the back plate for movement in any direction parallel to the plane of said plate, a brake shoe pivoted on said pivot member, coordinate screws for moving said pivot member relative to the back plate and means accessible on the outer side of the back plate for turning each of said screws.

5. In a brake for a vehicle wheel having a brake drum, the combination of a back plate, a pivot member supported on the inner side of the back plate for movement in any direction parallel to the plane of said plate, a brake shoe pivoted on said member, coordinate screws for moving said pivot member relative to the back plate, means accessible from the outer side of the back plate for rotating said screws, and resilient pawls mounted on the inner side of the back plate and engaging an index member on the outer side of said plate to hold the said screws in the position to which they have been rotated.

6. In a brake for a vehicle wheel having a brake drum, the combination of a back plate, a floating pivot member slidably supported on the inner side of the back plate for movement in any direction parallel to the plane of said plate, said pivot member having an arcuate bearing surface, a brake shoe having an arcuate bearing surface engaging the bearing surface of the pivot member to adapt the shoe for pivotal movement about said pivot member, adjusting means for moving the pivot member in a direction to center the brake shoe with respect to the brake drum, adjusting means for moving the pivot member towards the brake drum to compensate for wear, and means accessible from the outer side of the back plate for operating each of said adjusting means.

7. In a brake for a vehicle wheel, the combination of a back plate, a brake shoe movably mounted on the inner side of said plate, said back plate being provided with a pocket opening to the outer side of said plate and projecting on the inner side of said plate, said pocket having a threaded opening through a side wall thereof, a rotatable screw extending through said opening and engaging the threads thereof, and having a head portion disposed in said pocket where it is accessible from outside the back plate and an inner portion cooperating with the brake shoe to adjust the position of said shoe relative to the back plate by rotation of said screw, and a resilient pawl mounted on the inner side of the back plate and engaging an index member on the outer side of said plate to hold said screw in the position to which it has been rotated.

8. In a brake for a vehicle wheel having a brake drum, the combination of a back plate forming with said brake drum a substantially closed space, a pivot member supported on the inner side of the back plate for movement in any direction parallel to the plane of said plate, a brake shoe pivoted on said pivot member, and coordinate screws for moving said pivot member relative to the back plate, each of said screws extending through said back plate and having a head portion accessible on the outer side of the back plate for turning said screws to adjust the position of said pivot member.

ASBURY S. EDMONDS.